(12) United States Patent (10) Patent No.: US 12,580,518 B1

Denson (45) Date of Patent: Mar. 17, 2026

(54) SOLAR PANEL SECURED TO A PORTABLE ELECTRONIC DEVICE

(71) Applicant: Bernard Denson, Hastings, FL (US)

(72) Inventor: Bernard Denson, Hastings, FL (US)

( * ) Notice: Subject to any disclaimer, the term of this patent is extended or adjusted under 35 U.S.C. 154(b) by 0 days.

(21) Appl. No.: 19/044,248

(22) Filed: Feb. 3, 2025

(51) Int. Cl.
| | |
|---|---|
| *H02S 20/30* | (2014.01) |
| *H02S 40/30* | (2014.01) |
| *A45F 5/00* | (2006.01) |
| *H02J 7/34* | (2006.01) |
| *H02J 7/35* | (2006.01) |
| *H02J 7/70* | (2026.01) |
| *H02S 40/38* | (2014.01) |
| *H04B 1/03* | (2006.01) |

(52) U.S. Cl.
CPC .............. *H02S 20/30* (2014.12); *H02S 40/30* (2014.12); *A45F 5/1525* (2025.01); *H02J 7/342* (2020.01); *H02J 7/35* (2013.01); *H02J 7/731* (2026.01); *H02S 40/38* (2014.12); *H04B 1/03* (2013.01)

(58) Field of Classification Search
CPC .......... H02S 20/30; H02S 40/30; H02S 40/38; H02J 7/35; H02J 7/342; H02J 7/731; A45F 5/1525; H04B 1/03
See application file for complete search history.

(56) References Cited

U.S. PATENT DOCUMENTS

| | | | | |
|---|---|---|---|---|
| 11,715,971 B1* | 8/2023 | Hill | .......................... | H02J 7/342 |
| | | | | 455/575.1 |
| 2016/0134142 A1* | 5/2016 | Murphy | ................ | H02J 7/0044 |
| | | | | 455/573 |
| 2017/0366026 A1* | 12/2017 | Todd | .......................... | H02J 7/00 |
| 2021/0177115 A1* | 6/2021 | Brown | .................... | A45C 11/00 |

FOREIGN PATENT DOCUMENTS

| | | | | |
|---|---|---|---|---|
| CN | 218830050 U | * | 4/2023 | |
| WO | WO-2017013293 A1 | * | 1/2017 | ............. H02S 40/38 |

\* cited by examiner

*Primary Examiner* — Michael Y Sun

(74) *Attorney, Agent, or Firm* — Lawrence J. Gibney

(57) ABSTRACT

One of the big challenges for anyone who owns a portable electronic device is the need to constantly maintain a charge on the device. Typically, the portable electronic device is sold with a power cord that the user can plug into an outlet of a home or a car. Many users have one power cord for the car and a separate cord for the car so that the user always has the capability to charge the portable electronic device. The current device will charge the portable electronic device using a photovoltaic panel that is attached to the back surface of the portable electronic device with a clip that is either integral to the solar panel or a removable clip in an alternative embodiment.

4 Claims, 7 Drawing Sheets

SOLAR PANEL SECURED TO A PORTABLE ELECTRONIC DEVICE

BACKGROUND OF THE INVENTION

A. Field of the Invention

This is a device that will allow a cell phone to be recharged based on the use of a solar panel or photovoltaic panel, which is attached to the outside of a portable electronic device to ensure that the portable electronic device remains charged. There are many different types of portable electronic devices including cell phones, tablets, and iPads but for purposes this application, the use of a photovoltaic panel in relation to a cell phone will be discussed.

B. Prior Art

A representative example in the prior art that teaches the ability to recharge a portable electronic device includes Chinese patent CN203073373, that teaches efficient solar electric power storage and charging protective cover for a cell phone. Another reference in the prior art includes the Chinese patent 201126847 which is a solar mobile telephone charger.

None of the prior art references teach a power cord that extends from one end of a photovoltaic panel to the connection port of the cell phone.

The two prior art references discuss the use of rechargeable panels but do not discuss the use of the charging clip with an alternating power cord or a removable clip that provides access to use an alternating power cord. The use of a power cord that can mate with the cell phone will eliminate the need for multiple power cords.

BRIEF SUMMARY OF THE INVENTION

The use of portable electronic devices and specifically the cell phone is ubiquitous in today's culture. The cell phone is quickly replacing the traditional land line telephone systems. Some of the principal advantages of the portable electronic device include the capacity to store information and the ease by which the device can be transported.

However, a challenge for users of portable electronic devices and specifically the cell phones is the need to constantly maintain an electrical charge on the device. Although the power requirements are not great, the cell phone will not operate without power. As the cell phone ages the phone's capability to store energy is reduced. Most portable electronic devices are sold with a power cord for the purpose of providing a link between the wall of the house or building or the power source for a car to the phone.

Each portable electronic device will have a unique power cord and connection port depending on the manufacturer of the phone. Each brand of portable electronic device may have a different connector for each specific portable electronic device. Portable electronic devices may include cell phones or tablets, to name some of the more common portable electronic devices. Regardless of the brand or make or model of the portable electronic device all require a power source.

The current application solves the problem of having multiple charging cords and instead links a photovoltaic panel (solar panel) to the back of the portable electronic device with an integrated clip that is linked directly between the solar panel and the charging port of the phone.

The device contemplates two embodiments.

In the first embodiment the solar panel with integral charging clip is secured to the back surface. The charging clip mates with the charging port of the phone. In this embodiment the clip is integral to the solar panel and is designed to remain with the solar panel.

In the first embodiment an opening to charge the phone using the clip is provided if the user wishes to plug the phone into a wall outlet with a standard electrical power cord.

In the second embodiment the device has a charging clip that attaches to the solar panel and mates with the charging port of the phone. The clip is designed to be removed if the person wants to use a standard electrical power cord to charge the phone.

Regardless of the embodiment that is selected, protective bumpers are provided to protect both the solar panel and the face of the phone from damage.

Additionally, the placement of the solar panel will not interfere with the operation of the camera and an opening for the camera lens is provided for the solar panel that will cover the area of the camera lens.

NUMBERING REFERENCE

Figure 1:
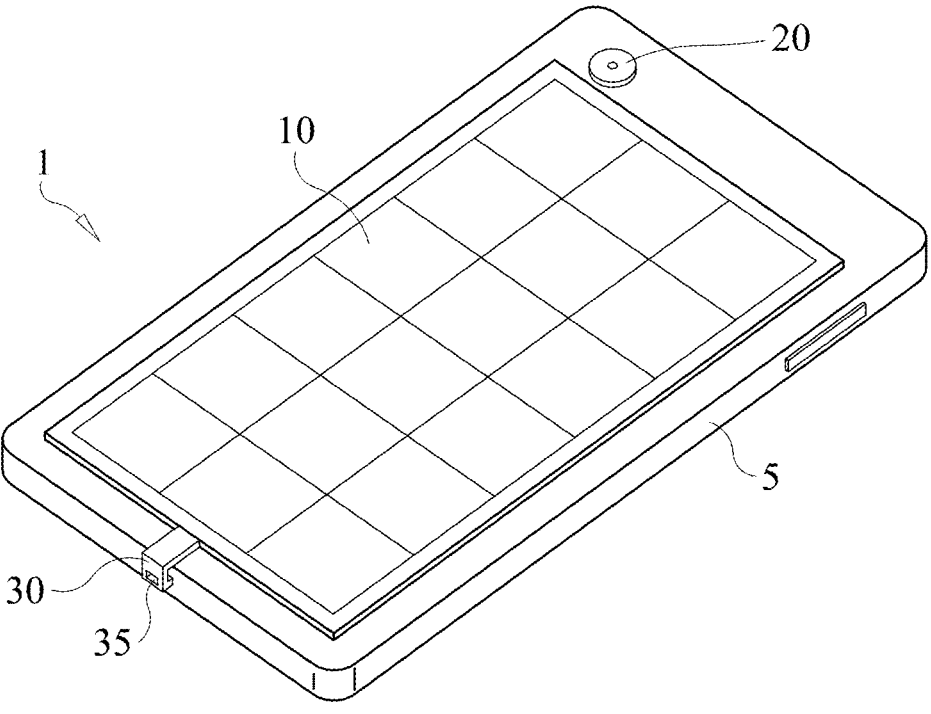
FIG. 1 is a perspective view of the first embodiment of the device depicting the back of the cell phone.
Figure 2:
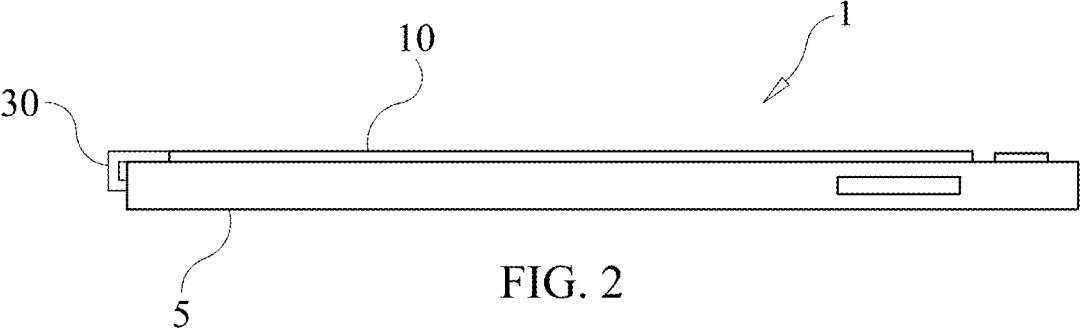
FIG. 2 is a side view of the first embodiment of the solar panel attached to back surface of the cell phone.
Figure 3:
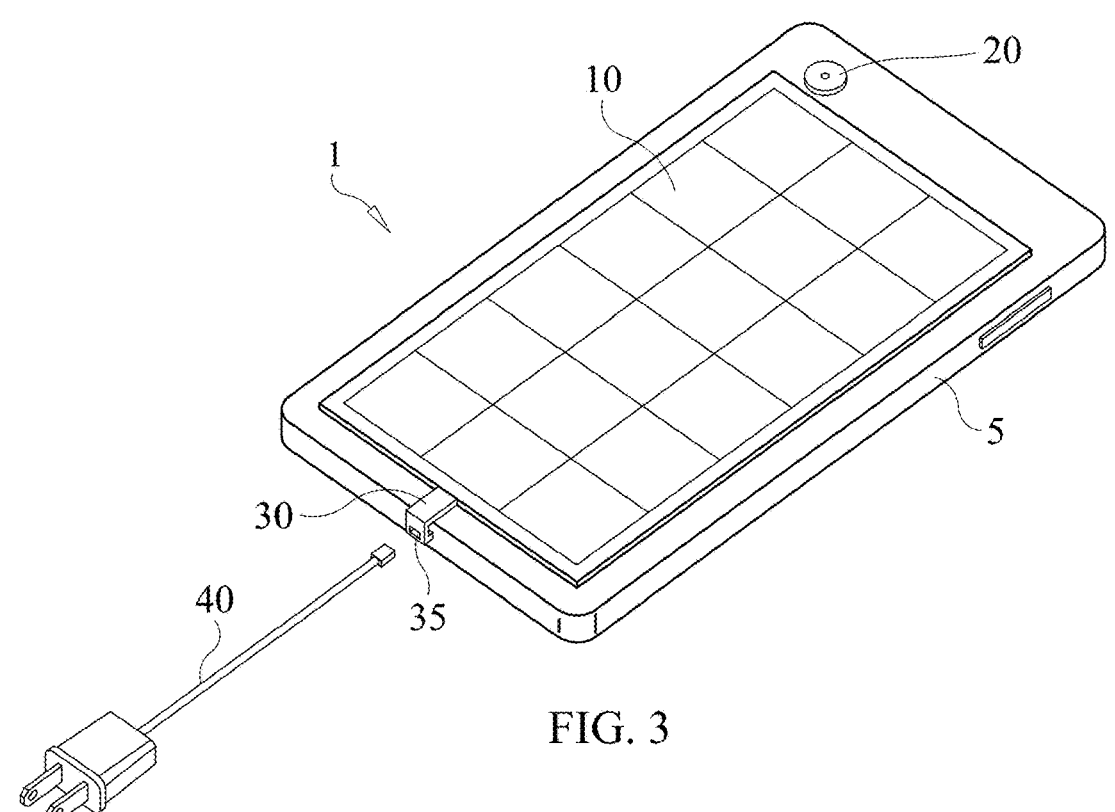
FIG. 3 is a perspective view of the first embodiment of the back of the cell phone and the solar panel depicting the clip and the alternating current power cord not attached to the clip.

1 Device
5 Portable electronic device

10 Solar Panel (Photovoltaic Panel)
Protective Cover for Solar Panel
20 Camera lens
30 Charging clip
35 Mating Port for Charging Clip
40 Alternating Power Cord
Storage Pouch
45 Protective Bumpers
50 Removable Clip

DETAILED DESCRIPTION OF THE EMBODIMENTS

The device 1 is a photovoltaic panel (solar panel) that will be attached to the back of a portable electronic device 5. There are many different types of portable electronic devices such as tablets and cell phones to name a few. For purposes of this application the cell phone will be discussed and is depicted in the Figures that accompany this application. The device will be custom made to fit a specific make or model of portable electronic device or specific make and model of a cell phone 5.

In the example of a cell phone the phone has a defined structure that is usually rectangular with a keyboard on the front (not depicted) of the phone and one or more camera lenses on the back surface. Each phone will have a slightly different structure, but most have this basic shape.

A critical feature of the cell phone is the ability of the user to charge the phone. All cell phones have a built-in charging port (not depicted) to plug a cord into the charging port to provide power to the phone. In this application (in either embodiment) a clip will be used to provide a link between the solar panel and the phone charging port.

The solar panel 10 will be secured to the back of the cell phone but will not obstruct the camera lens(es) 20 on the back of the phone such as depicted in FIG. 1. The solar panel 10 will be slightly smaller than the back surface of the cell phone and will be thin enough to not interfere with the storage of the cell phone of a person's ability to stow the cell phone in a holder.

Regardless of which embodiment is selected, a protective cover 12 over the solar panel will be provided to protect the solar panel from damage. Protective bumpers 45 will also be provided on the perimeter of the phone to elevate the surface of the face of the phone and the solar panel to prevent damage to both the face of the phone and the solar panel. No specific protective bumpers to elevate the cell phone are being claimed.

Figure 4:
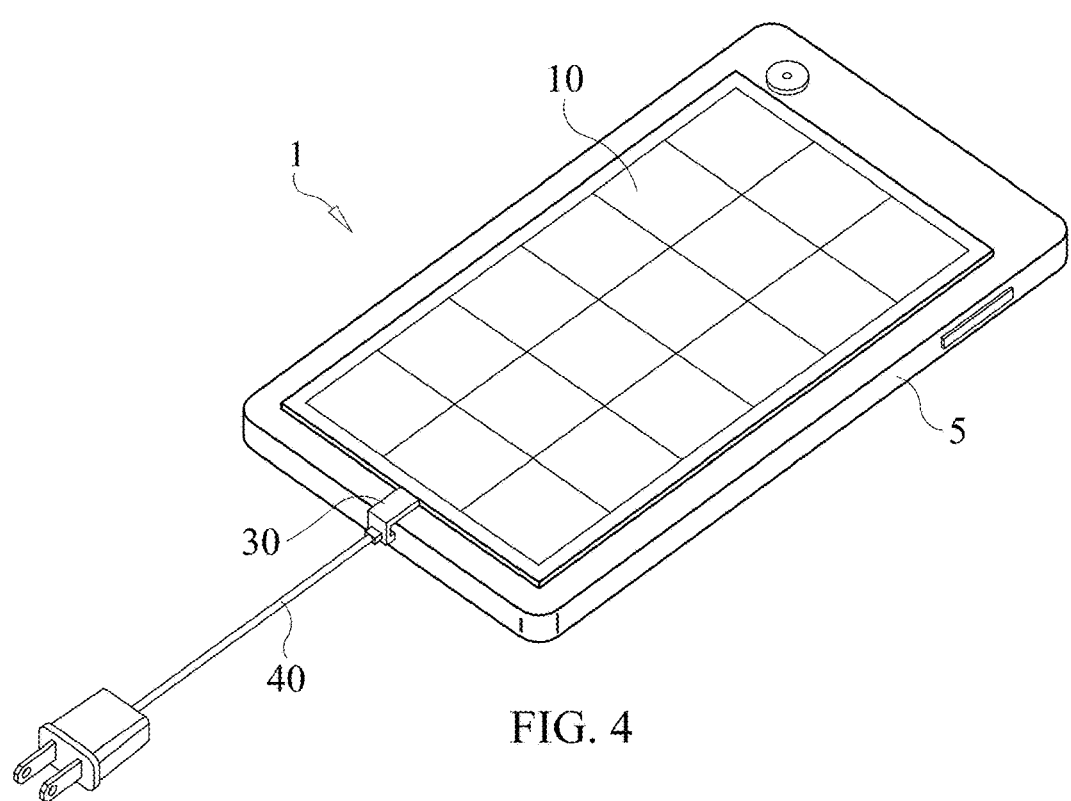
FIG. 4 is a perspective view of the first embodiment of the device attached to the back surface of the cell phone with an opening for the camera and the power cord mated with power port for the phone.
Figure 5:
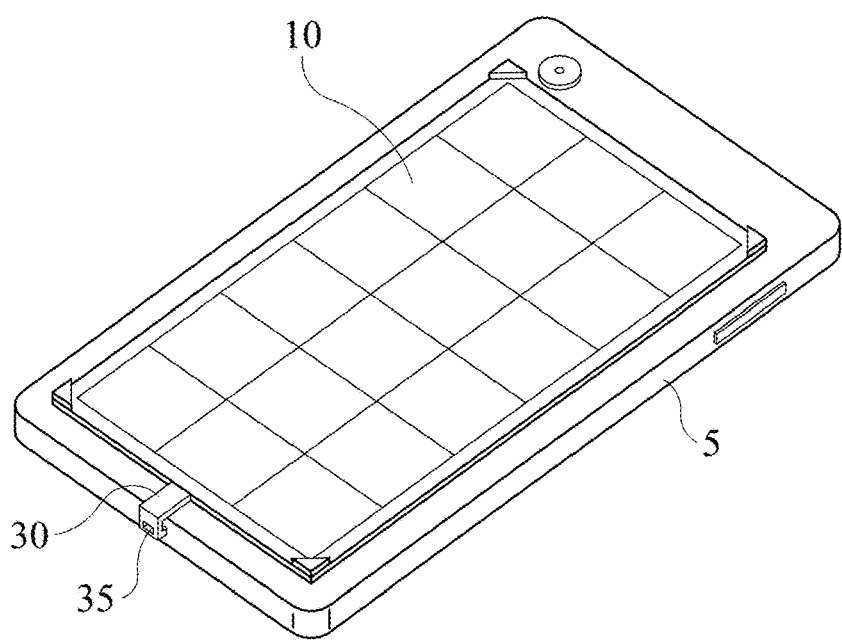
FIG. 5 is a perspective view of the first embodiment of the solar panel attached to the back of cell phone with the protective cover over the solar panel.
Figure 6:
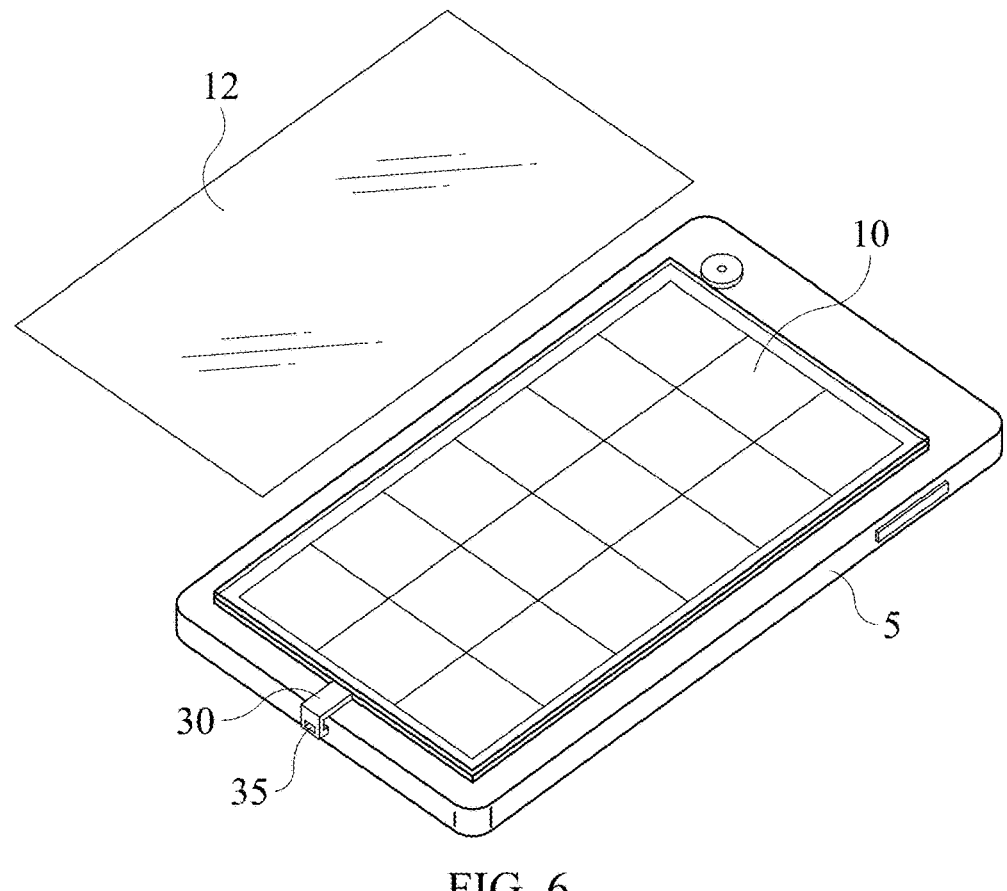
FIG. 6 is a exploded perspective view of the first embodiment of the solar panel with the solar panel protector.
Figure 7:
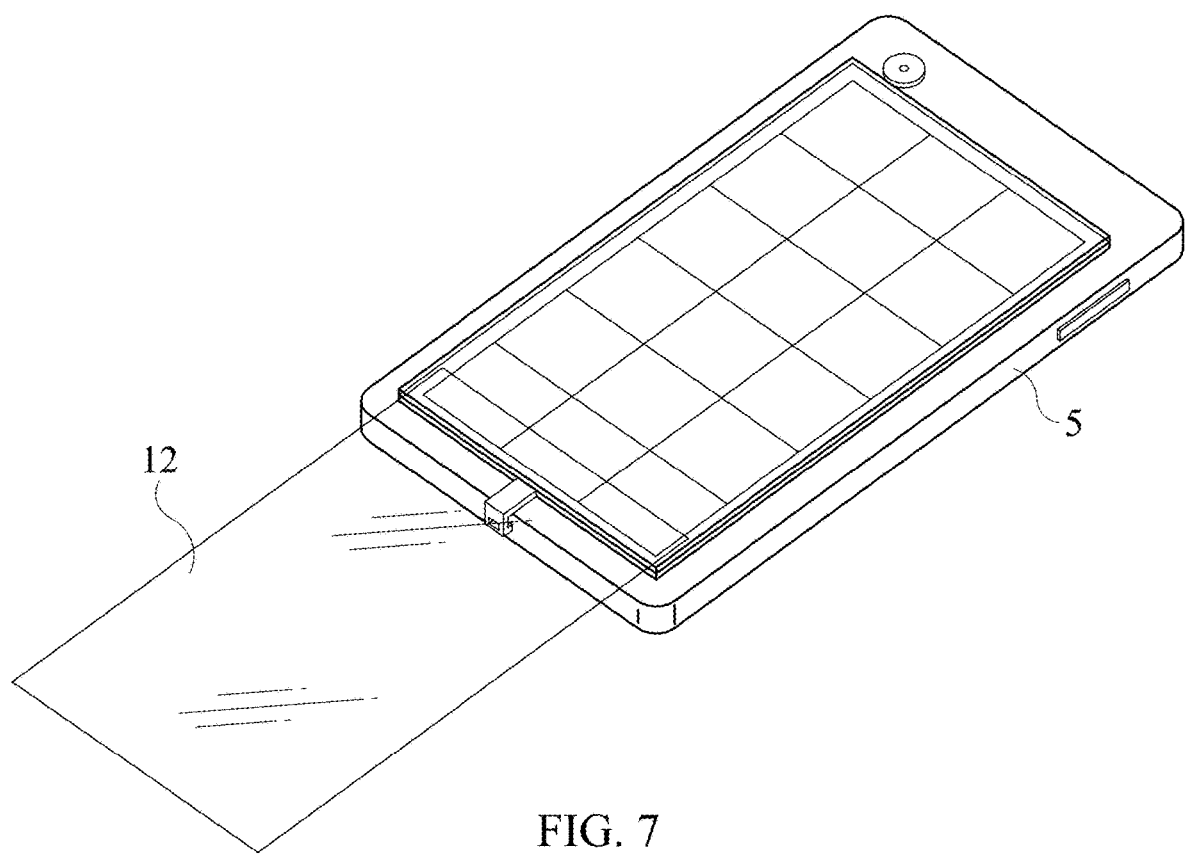
FIG. 7 is a perspective view of the first embodiment of the solar panel with the protective cover over a portion of the solar panel.
Figure 8:
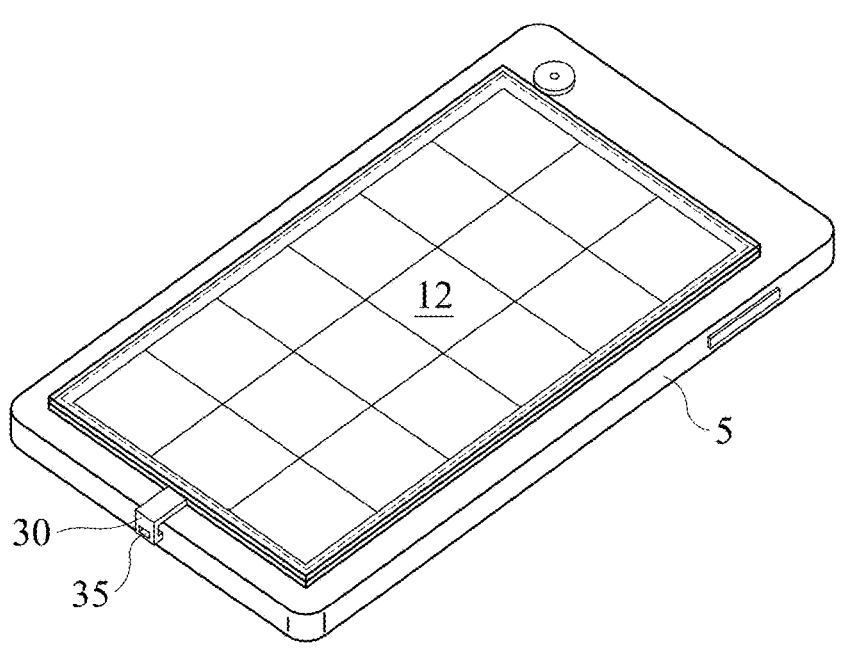
FIG. 8 is a perspective view of the first embodiment of the solar panel with the protective cover placed over the solar panel.
Figure 9:
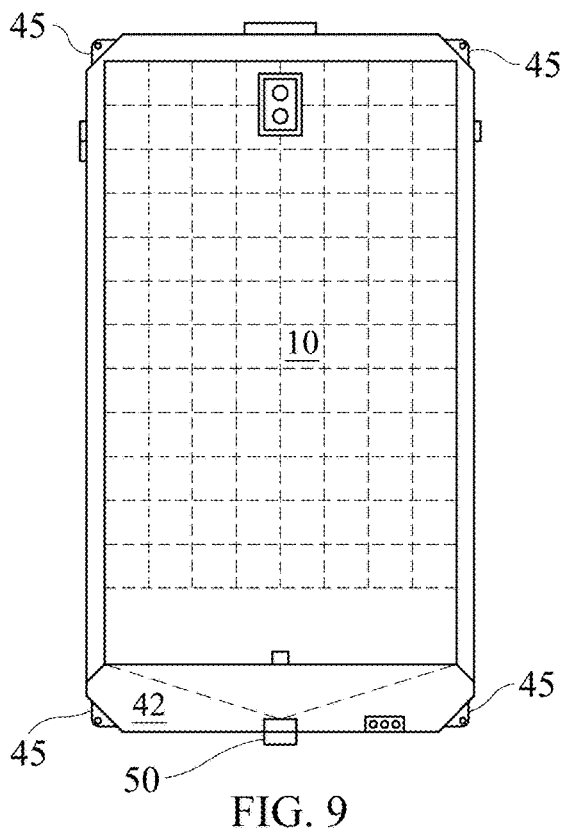
FIG. 9 is a front view of the second embodiment depicting the solar panel covering the back of the cell phone.
Figure 10:
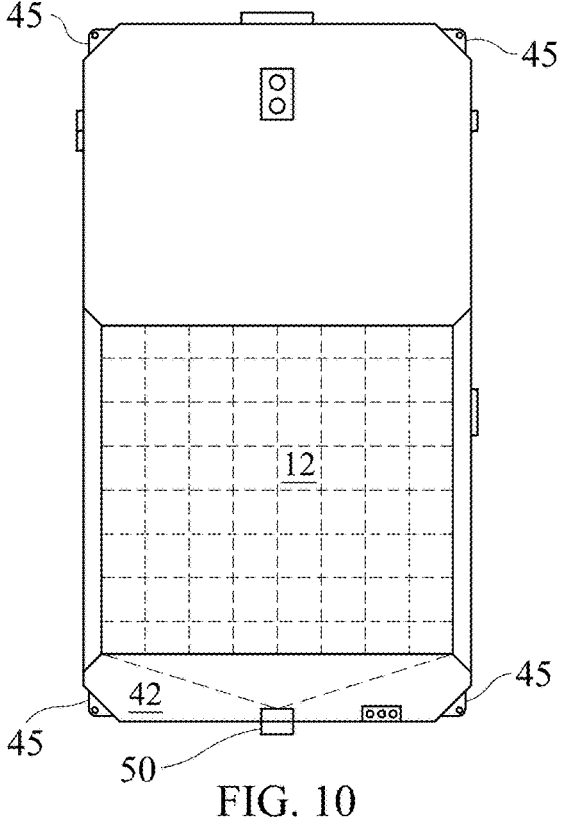
FIG. 10 is a top view of the second embodiment depicting the solar protector covering a portion of the back of the solar panel.
Figure 11:
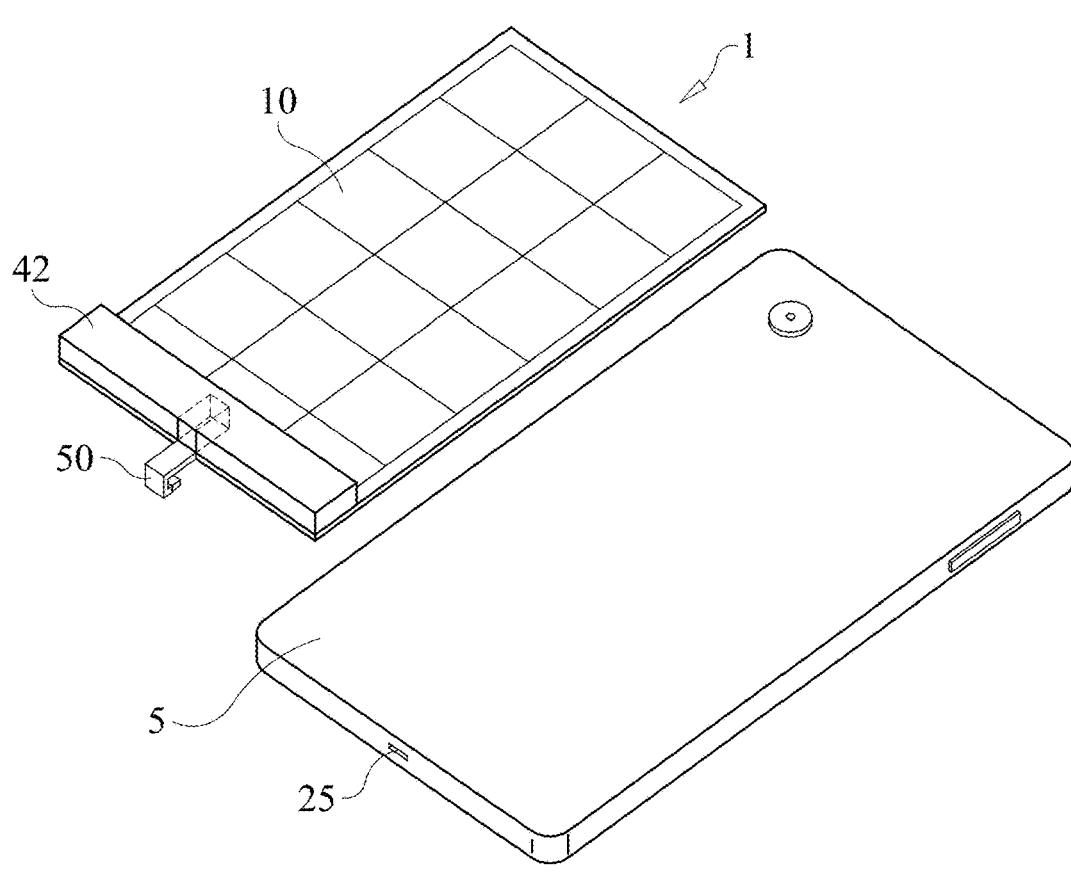
FIG. 11 is an exploded top view of the second embodiment of the device with the removable clip.
Figure 12:
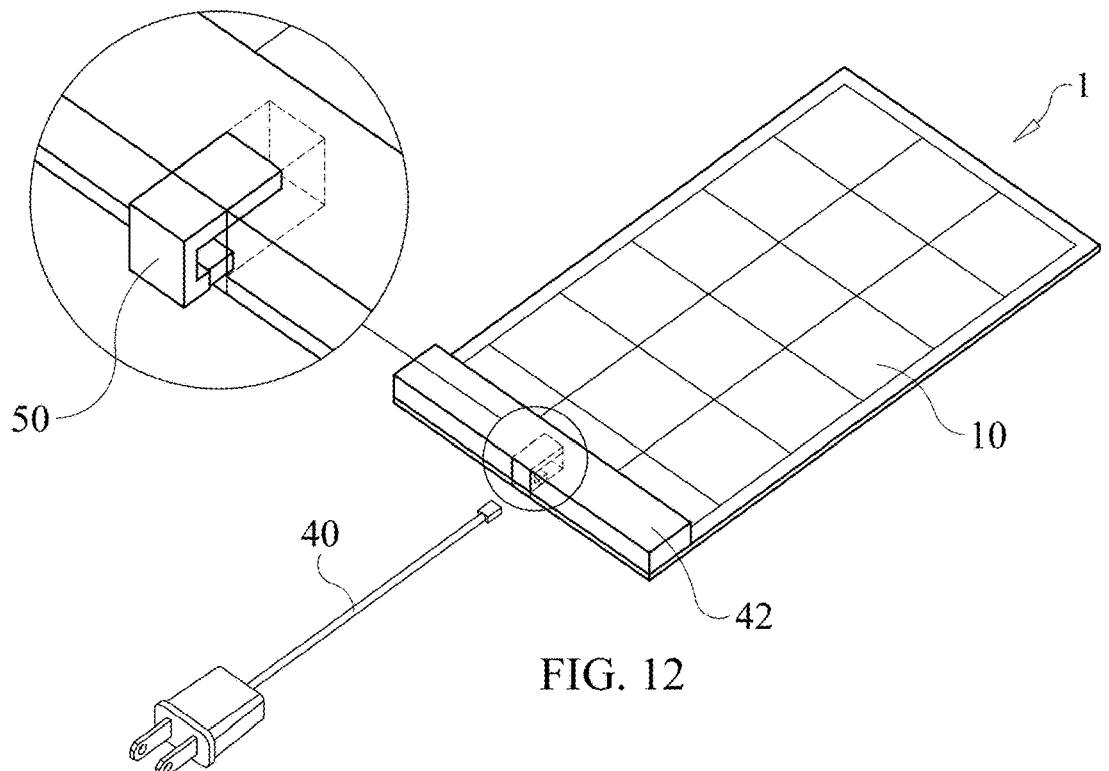
FIG. 12 is a fragmented view of the removable clip and depicting the mating port for the alternating current power source.
Figure 13:
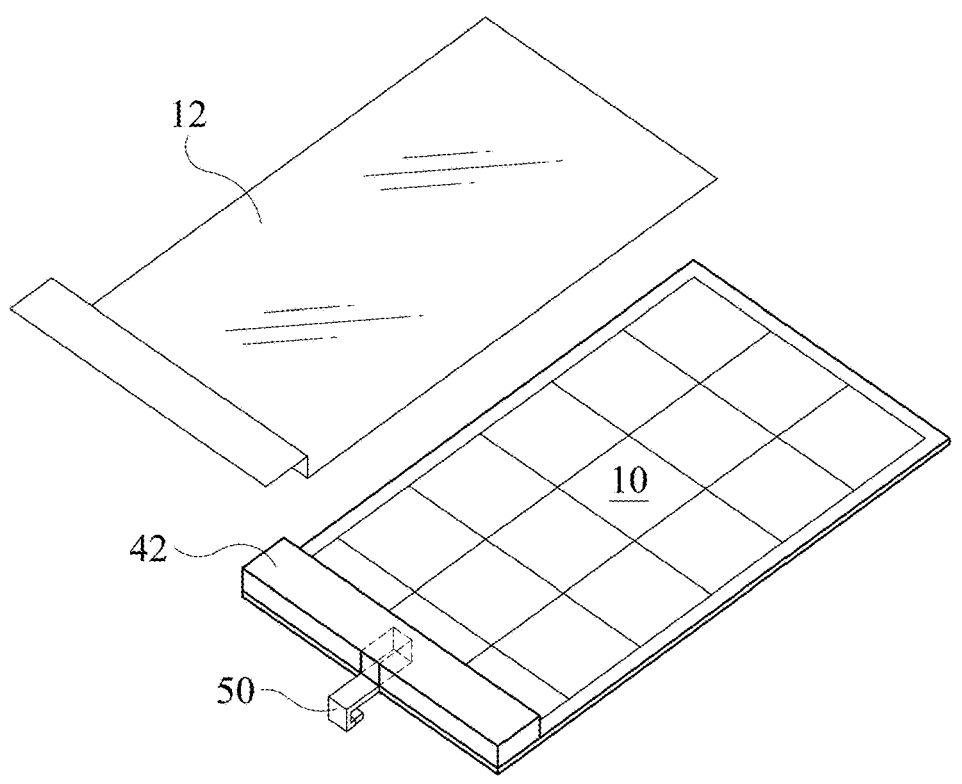
FIG. 13 is an exploded view of the protector over the solar panel
Figure 14:
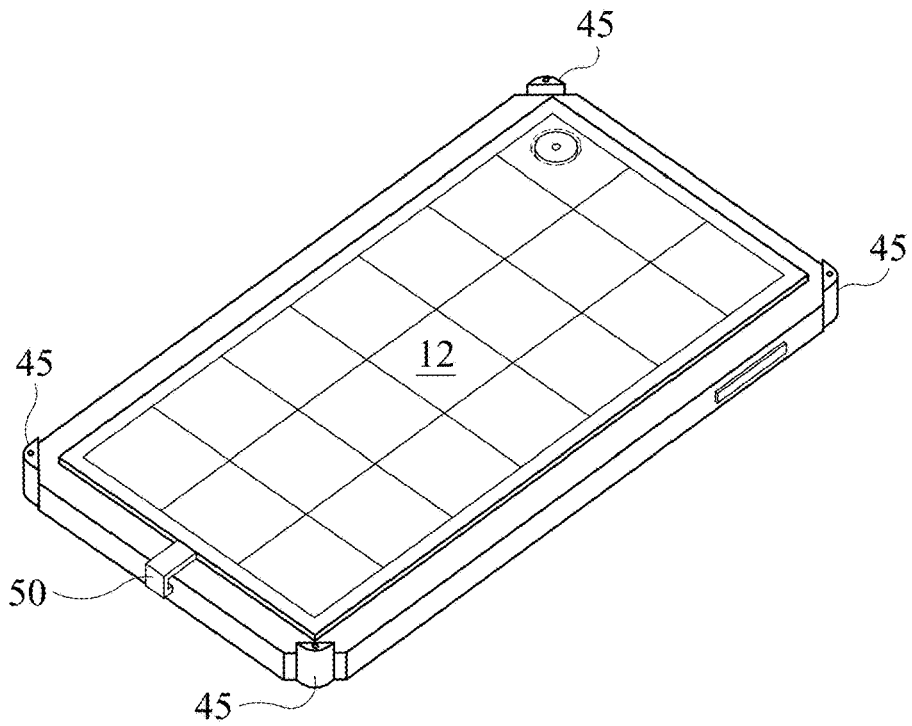
FIG. 14 is a perspective view of the protector installed over the back of the cell phone with the bumpers depicted to protect surface of the phone and the surface of the solar panel.

With the device as installed, the owner of the cell phone can still use the cell phone to make a phone call or send a text message and take a picture using the camera function with either the solar panel 10 that covers the camera lens 20 of the cell phone camera such as depicted in FIG. 4. An opening for the camera lens is provided on the panel for the panel that is depicted in FIG. 4.

First Embodiment

A photovoltaic panel or solar panel 10 will be secured to the back surface of the cell phone; in this embodiment the solar panel is attached to the back surface of the cell phone by the manufacturer and is not designed to be removed from the cell phone. Several methods to secure the solar panel can be used such as a thin adhesive strip on the solar panel or thin strips of Velcro may be used; no specific means of attachment is claimed in this application. The photovoltaic panel 10 will be constructed to not interfere with the function or handling or operation of the phone such as making a phone call or sending a text message.

A clip 30 is integral to the solar panel. The clip 30 will mate with the built-in charging port (not depicted) of the phone. An opening 35 on the clip will allow the user to use a standard electrical power cord 40 to charge the phone, if desired. The power cord can be removed if no longer needed.

When the cell phone is being transported the user can place the cell phone on any surface with the solar panel directed to the light source and can recharge the phone with solar light or any other type of light, including but not limited to fluorescent light.

Second Embodiment

In the second embodiment a removable clip 50 is detachable from the solar panel and can be removed to plug the phone into a power source in the house, business or car if desired; the clip 50 will provide a connection between the solar panel and the built-in charging port for the cell phone when the clip is installed.

A storage pouch 42 is provided to stow the removed clip once it is removed for charging purposes.

If the clip 50 is removed and the phone is charged using a power cord 40, the clip 50 can be reinserted into the solar panel and the mating port for the cell phone.

While the embodiments of the invention have been disclosed, certain modifications may be made by those skilled in the art to modify the invention without departing from the spirit of the invention.

The invention claimed is:

1. A solar panel that is secured to a portable electronic device, comprising
   the portable electronic device,
   wherein the portable electronic device has a defined structure,
   wherein the portable electronic device has a front surface and a back surface,
   a plurality of protective bumpers on a perimeter of sides of the portable electronic device,
   the solar panel,
   wherein the solar panel is a predetermined size,
   wherein the solar panel is slightly smaller than the back surface,
   a protective cover for the solar panel,
   wherein the solar panel is secured to the back surface of the portable electronic device,
   wherein a clip is integral to the solar panel,
   wherein the clip is inserted into a built-in charging port for the portable electronic device,
   wherein an opening is provided in the clip;
   said opening is compatible with a charging cord for the portable electronic device;
   wherein the charging cord can be plugged into an electrical outlet of a home;
   said charging cord has a first end and a second end;
   wherein the first end of the charging cord is plugged into the electrical outlet;
   wherein the second end of the charging cord is plugged into the opening of the clip for the portable electronic device;
   wherein the charging cord is inserted into the opening of the clip to provide power to the portable electronic device;
   wherein a storage pouch is provided to stow the removable clip;

wherein the protective cover is in direct contact with both the storage pouch and the solar panel.

2. The solar panel that is secured to the portable electronic device as described in claim 1, wherein the portable electronic device is a cell phone.

3. A solar panel that is secured to the back of a portable electronic device as described in claim 1, wherein the portable electronic device is a tablet.

4. A solar panel that is secured to the back of a portable electronic device as described in claim 1, wherein the portable electronic device is an iPad.

\* \* \* \* \*